United States Patent
Wang et al.

(10) Patent No.: US 8,565,300 B2
(45) Date of Patent: Oct. 22, 2013

(54) TRANSCODER, METHOD AND DEVICE FOR CONTROLLING CODE RATE

(75) Inventors: Xiaoyang Wang, Shenzhen (CN); Yi Zhang, Shenzhen (CN); Jing Wang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 425 days.

(21) Appl. No.: 12/956,532

(22) Filed: Nov. 30, 2010

(65) Prior Publication Data

US 2011/0069754 A1 Mar. 24, 2011

Related U.S. Application Data

(63) Continuation of application No. PCT/CN2009/072045, filed on May 31, 2009.

(30) Foreign Application Priority Data

May 31, 2008 (CN) .......................... 2008 1 0109867

(51) Int. Cl.
*H04N 7/18* (2006.01)
(52) U.S. Cl.
USPC ............. 375/240.03; 375/240.06; 375/240.07
(58) Field of Classification Search
USPC ....................................... 375/240.01–240.29
See application file for complete search history.

(56) References Cited

U.S. PATENT DOCUMENTS

| 5,231,484 A * | 7/1993 | Gonzales et al. ........ 375/240.04 |
| 2003/0095594 A1 | 5/2003 | Laksono et al. |
| 2007/0153916 A1 | 7/2007 | Demircin et al. |

FOREIGN PATENT DOCUMENTS

| CN | 1700771 A | 11/2005 |
| CN | 101102494 A | 1/2008 |
| WO | WO 2009/143783 A1 | 12/2009 |

OTHER PUBLICATIONS

First office action issued in corresponding European patent application No. 09753501.7, dated Apr. 17, 2013, total 7 pages.
Office Action mailed Oct. 9, 2010, issued in Chinese Patent Application No. 200810109867.5.
Zhang et al., "Quality Smoothing Adaptive Quantization Algorithm for High Bit-Rate," *Journal of Shanghai Jiaotong University*, vol. 37 No. 8, pp. 1312-1315 (2003).
First Chinese Office Action (Translation) of Chinese Application No. 200810109867.5, dated (mailed) Oct. 9, 2010 (Chinese version included), Huawei Tech Co., Ltd. (7 pgs.).
Extended European Search Report dated (mailed) Jul. 4, 2011, issued in related Application No. 09753501.7-2223, PCT/CN2009072045, Hauwei Technologies Co., Ltd.
Ming Li, "Frame Layer Rate Control for H.264/AVC with Hierarchical B Frames," Joint Video Team (JVT) of ISO/IEC MPEG & ITU-T VCEG (ISO/IEC JTC1/SC29/WG11 and ITU-T SG16 Q.6) 27$^{th}$ Meeting: Geneva, CH, Apr. 2008.
Shuai Wan, et al, "Frame-layer rate control for JVT video coding using improved quadratic rate distortion model," National Key Lab. on ISN, SiDian University, Xi'an Shannxi, 710071 China.

(Continued)

*Primary Examiner* — Andy Rao
(74) *Attorney, Agent, or Firm* — Huawei Technologies Co., Ltd.

(57) ABSTRACT

A method and device for controlling a code rate are provided, and this application relates to a video communication technology. The method for controlling a code rate includes the following steps. An output target bit of a current frame is acquired, where the current frame is a currently processed input frame. A target quantization parameter is acquired according to the output target bit by utilizing a nonlinear code rate control model. The present invention is applicable to transcoding between compressed videos.

20 Claims, 4 Drawing Sheets

Acquire an output target bit of a current frame, where the current frame is a currently processed input frame — 11

Acquire a target quantization parameter according to the output target bit by utilizing a nonlinear code rate control model — 12

(56) References Cited

OTHER PUBLICATIONS

Jordi Ribas-Corbera, et al, "Rate Control in DCT Video Coding for Low-Delay Communications," IEE Transactions on Circuits and Systems for Video Technology, vol. 9 No. 1. Feb. 1999.

Wei Ding, et al, "Rate Control of MPEG Video Coding and Recording by Rate-Quantization Modeling," XP000625575 IEEE Transactions on Circuits and Systems for Video Technology. vol. 6 No. 1. Feb. 1996.

Tihao Chiang, et al, "An Overview of the Encoding Tools in the MPEG-4 Reference Software," ISCAS 2000—IEEE International Symposium on Circuits and Systems, Geneva, Switzerland, May 2000.

Written Opinion of the International Searching Authority (translation) dated (mailed) Sep. 10, 2009, issued in related Application No. PCT/CN2009/072045, filed May 31, 2009, Huawei Technologies Co., Ltd.

Zhang, Wei, "Quality Smoothing Adaptive Quantization Algorithm for High Bit-Rate," Aug. 2003,pp. 1312-1315, Journal of Shahghai Jiaotong University, vol. 37, No. 8, Shanghai 200030, China.

International Search Report for International Application No. PCT/CN2009/072045, mailed Sep. 10, 2009 Huawei Technologies C., Ltd 4pgs.

\* cited by examiner

TRANSCODER, METHOD AND DEVICE FOR CONTROLLING CODE RATE

CROSS-REFERENCE TO RELATED APPLICATIONS

This application is a continuation of International Application No. PCT/CN2009/072045, filed on May 31 2009, which claims priority to Chinese Patent Application No. 200810109867.5, filed on May 31, 2008, both of which are hereby incorporated by reference in their entireties.

FIELD OF THE INVENTION

The present invention relates to a video communication technology, and more particularly to a transcoder, a method for controlling a code rate, and a device for controlling a code rate.

BACKGROUND OF THE INVENTION

With the development of information technologies, applications of multimedia technologies in networks are unprecedentedly developed, and video communication technologies, as important components of the multimedia technologies, are also greatly developed and widely applied. Because the amount of data of a video sequence is huge, a video is compressed before network transmission. Common video compression standards include the MPEG-2 (formulated by Moving Picture Experts Group, i.e. MPEG) standard for DVB, HDTV, and DVD, the MPEG-4 standard developed for a streaming media service in a network, the H.263 (formulated by International Telecommunication Union, i.e. ITU) standard proposed for videotelephony and video services, and the up-to-date H.264/AVC (formulated by Joint Video Team, i.e. JVT) standard and so on. In order to enable video data to be exchanged transparently between heterogeneous networks, between different access equipments, and between media data formats in different standards, transcoding between compressed video code streams becomes a hotspot research direction in digital video technology field.

Transcoding is a technology that a compressed video code stream in one standard and format is processed into a compressed video code stream in another standard and format which is more adapted to a certain specific application. Video transcoding performs end-to-end processing on a compressed video code stream, so that a compressed code stream after transcoding is more adapted to requirements of transmission channel bandwidth and a receiving end.

Main technologies for video transcoding can be categorized into code rate conversion, definition conversion, frame rate conversion, and syntax conversion. In a process of conversion, it is usually needed to perform code rate control. The code rate control is a flow control mechanism which avoids network congestion as much as possible, as well as fully utilizing network resources and guaranteeing video quality; and in a case that end-to-end time delay is as low as possible, the code rate control guarantees that a buffer neither overflows nor underflows. By allocating a target bit to a frame to be encoded, the code rate control further determines quantization parameters of the frame to be encoded, so as to control a code rate output by a transcoder. The code rate control can be categorized into two control methods, namely, frame layer code rate control and macro block layer code rate control.

The prior art provides a frame layer code rate control method which is adaptable in a process of transcoding from an MPEG-2 compression standard to an MPEG-4 compression standard. Information of bit stream is input at a decoding end of the transcoder. The information, such as image type, digits used by each frame, and average quantization parameters, is collected for performing code rate control on the output of a transcoder encoding end.

In the prior art, target bit rate ratio is calculated first. Target bit rate ratio of each frame is equal to: a ratio of a target bit $N_0^j$ output by the frame to a bit $N_i^j$ input by the frame, where j denotes the sequence number of the frame.

$$r^j = N_o^j / N_i^j \qquad (1\text{-}1)$$

In a process of video encoding, a direct factor deciding digits used during encoding is a quantization parameter adopted at the time of quantizing obtained Discrete Cosine Transform (DCT) coefficients after performing DCT. The quantization parameter reflects a compression of details. If the quantization parameter is small, a majority of details are retained, and the code rate is higher. If the quantization parameter is great, partial details are discarded, the code rate is reduced, but image distortion is more serious, and quality is not high. That is to say, the quantization parameter is inversely proportional to the bit rate. In a process of transcoding, a basic method for code rate control is controlling a code rate of a code stream output by the transcoder by adjusting the quantization parameter.

The prior art utilizes the foregoing obtained target bit rate ratio, and establishes a code rate control model according to the following equation:

$$Q_o^j N_o^j = Q_i^j N_i^j \qquad (1\text{-}2)$$

In the equation, $Q_i^j$ is a quantization parameter of an MPEG-2 video frame currently input by the transcoder, and $Q_0^j$ is a target quantization parameter of an MPEG-4 video frame currently output by the transcoder.

A target quantization parameter output by the video frame which can be obtained from the equation 1-2 is $$Q_o^j = Q_i^j \cdot N_i^j / N_o^j = Q_i^j / r^j \qquad (1\text{-}3)$$

In order to make the obtained target quantization parameter to be more precise, a coefficient $\alpha_k^j$ is used to modify the obtained target quantization parameter, and the coefficient $\alpha_k^j$ is equal to: a ratio of accumulated complexity of a code stream output by the transcoder to that of a code stream input by the transcoder.

$$\alpha_k^j = \frac{\sum_{j=0}^{k-1} Q_o^j \cdot N_o^j}{\sum_{j=0}^{k-1} Q_i^j \cdot N_i^j} \qquad (1\text{-}4)$$

In the above equation, j denotes the sequence number of a frame, $N_0^j$ is the actual encoding bit number of a $j^{th}$ output frame, and $N_i^j$ is the actual encoding bit number of a $j^{th}$ input frame.

A target quantization parameter further obtained by utilizing the coefficient $\alpha_k^j$ is $$Q_o^j = \alpha_k^j \cdot Q_i^j / r^j \qquad (1\text{-}5)$$

In order to enable the obtained target quantization parameter to be self-adaptively controlled by an actual encoding bit, a parameter $\beta_k^j$ is introduced. The parameter is equal to a ratio of the actual accumulated bit number of an encoded output frame to the actual accumulated bit number of a corresponding input frame, divided by a ratio of the target bit number of a current output frame to the bit number of a current input frame.

$$\beta_k^j = \frac{\sum N_o^j}{\sum N_i^j} \bigg/ \frac{N_o^j}{N_i^j} \qquad (1\text{-}6)$$

The target quantization parameter finally obtained according to the parameter $\beta_k$ is $$Q_o^j = \beta_k^j \cdot \alpha_k^j \cdot Q_i^j / r^j \qquad (1\text{-}7)$$

Encoding is performed according to the obtained target quantization parameter to acquire a code stream after performing the code rate control.

In a process of implementing the present invention, the inventors find that the prior art has at least the following problems.

A linear code rate control model adopted by the prior art is not applicable to a process of transcoding from MPEG-2/MPEG-4/H.261/H.263 to H.264, and an expected quantization parameter cannot be derived by the model, which results in that output code stream quality obtained by the transcoder according to the encoding of the quantization parameter is lower, and the code rate control is not accurate.

SUMMARY OF THE INVENTION

The present invention provides a transcoder, a method for controlling a code rate, and a device for controlling a code rate, where the transcoder, the method and the device are capable of more accurately controlling the code rate in a case of satisfying target bandwidth and guaranteeing code stream quality.

In an aspect, an embodiment of the present invention provides a method for controlling a code rate, where the method is capable of both satisfying target bandwidth and guaranteeing code stream quality to accurately control the code rate.

Technical solutions according to the embodiment of the present invention disclose a method for controlling a code rate. The method includes the following steps.

An output target bit of a current frame is acquired, where the current frame is a currently processed input frame.

A target quantization parameter is acquired according to the output target bit by utilizing a nonlinear code rate control model.

In another aspect, an embodiment of the present invention provides a device for controlling a code rate, where the device is capable of both satisfying target bandwidth and guaranteeing code stream quality to accurately control the code rate.

Technical solutions according to the embodiment of the present invention disclose a device for controlling a code rate. The device includes an output target bit acquiring unit and a quantization parameter acquiring unit.

The output target bit acquiring unit is configured to acquire an output target bit of a current frame, where the current frame is a currently processed input frame.

The quantization parameter acquiring unit is configured to acquire a target quantization parameter according to the output target bit acquired by the output target bit acquiring unit by utilizing a nonlinear code rate control model.

In another aspect, an embodiment of the present invention provides a transcoder, which is capable of both satisfying target bandwidth and guaranteeing code stream quality to accurately control the code rate.

Technical solutions according to the embodiment of the present invention disclose a transcoder, which includes a decoding device, a code rate control device, and an encoding device.

The decoding device is configured to acquire input transcoding information of an input video code stream.

The code rate control device is configured to acquire an output target bit according to output transcoding information and the input transcoding information acquired by the decoding device, and acquire a target quantization parameter of an output end according to a nonlinear code rate control model by utilizing the output target bit.

The encoding device is configured to perform encoding according to the target quantization parameter acquired by the code rate control device to generate an output code stream.

According to the embodiments of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiments of the present invention perform transcoding, the target bandwidth can be satisfied and the code stream quality can also be guaranteed to accurately control the code rate.

DETAILED DESCRIPTION OF THE EMBODIMENTS

In order to illustrate the technical solutions under the present invention clearer, the accompanying drawings for illustrating the embodiments of the present invention are outlined below. The following description is for the exemplary purpose only, and persons having ordinary skill in the art can derive other detailed description according to such embodiments without any creative effort. Reference to "module" encompasses elements that can be figured as hardware, software, or a combination of hardware and software, as is understood by personnel of ordinary skill in the telecommunications field.

In the embodiments, the present invention provides a method for controlling a code rate, a device for controlling a code rate, and a transcoder, which are capable of both satisfying target bandwidth and guaranteeing code stream quality to accurately control the code rate. The embodiments of the present invention are illustrated in detail hereinafter.

Figure 1:
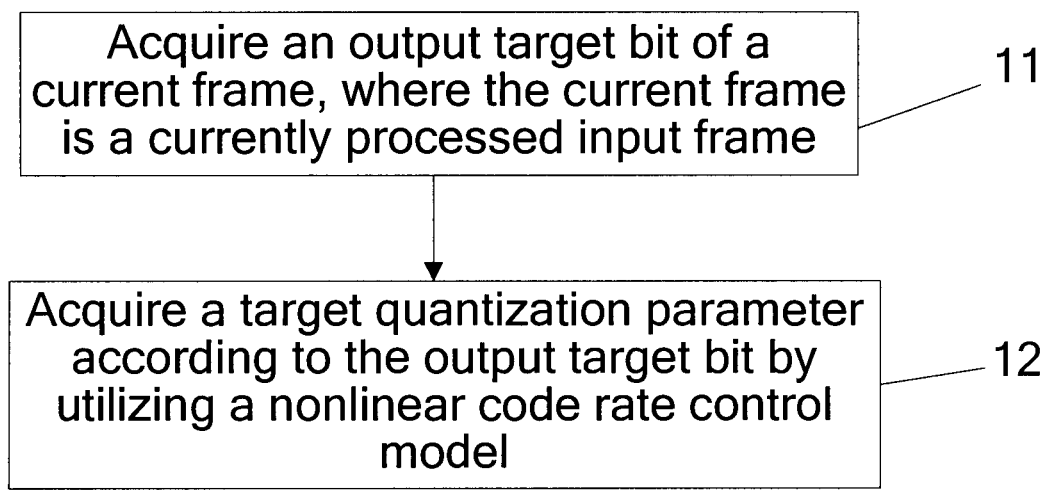
FIG. 1 is a flowchart of a method for controlling a code rate according to a first embodiment of the present invention.

Technical solutions according to the embodiments of the present invention disclose a method for controlling a code rate. As shown in FIG. 1, the method includes the following steps.

In step 11, an output target bit of a current frame is acquired, where the current frame is a currently processed input frame.

In step 12, a target quantization parameter is acquired according to the output target bit by utilizing a nonlinear code rate control model.

According to the embodiment of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiment of the present invention perform transcoding, the target bandwidth can be satisfied and the code stream quality can also be guaranteed to accurately control the code rate.

In a current digital television video, the MPEG-2 video compression standard is mainly adopted, the formed code stream code rate is high, and the required bandwidth is strict, while the H.264 video compression standard is capable of having a higher compression rate and good network interface characteristics on the premise of maintaining the same signal noise ratio, and as a result, the H.264 standard becomes an important selection for video protocols. According to the embodiment of the present invention, code rate control in a process of transcoding from MPEG-2, MPEG-4, H.261, and H.263 to H.264 is illustrated as an example.

In step 11, an output target bit of a current frame is acquired, where the current frame is a currently processed input frame.

According to the embodiment of the present invention, in order to acquire an initial output target bit of the current frame, at first, a ratio of output bandwidth and initial output target bit of the current frame is determined: $R_o/N_o^j = R_i/N_i^j$, where $R_o$ is target bandwidth of an output code stream, $R_i$ is bandwidth of an input code stream, $N_o^j$ is the initial output target bit of the current frame, $N_i^j$ is an input bit of the current frame, $R_o$ can be configured by a system or a user, and $R_i$ and $N_i^j$ can acquire information from the input code stream. In the embodiment of the present invention, the output target bit is the number of occupied bits in need of being set for the output code stream of the transcoder before transcoding.

Figure 2:
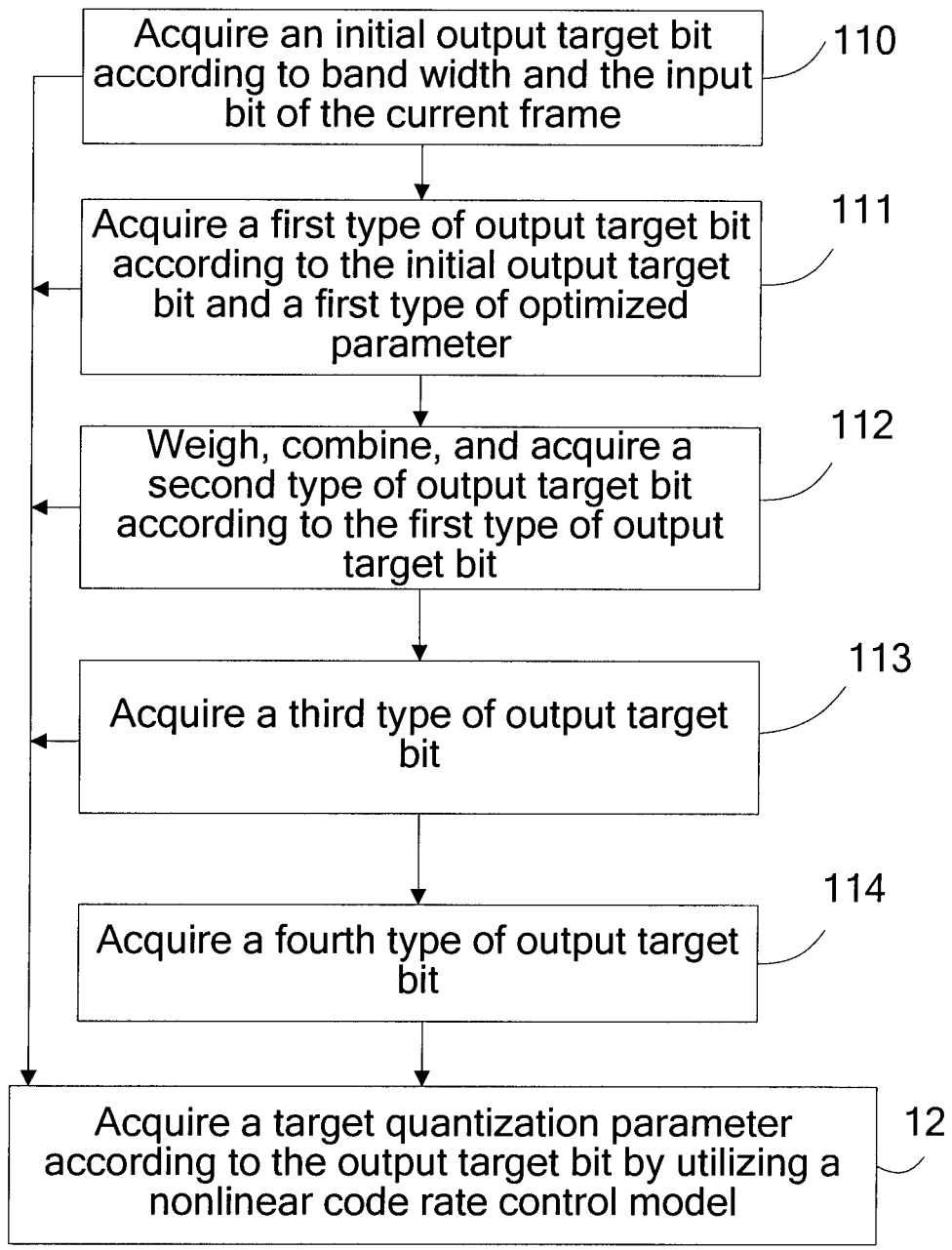
FIG. 2 is a flowchart of a method for controlling a code rate according to a second embodiment of the present invention.

As shown in FIG. 2, step 11 includes the following steps.

In step 110, an initial output target bit $$N_o^j = N_i^j \cdot \frac{R_o}{R_i}$$

is acquired according to target bandwidth of an output code stream, bandwidth of an input code stream and the input bit of the current frame.

According to the embodiment of the present invention, when the initial output target bit is acquired, respective character of each frame image is considered, instantaneity of the image is reflected, and an input bit of each frame image is utilized. The acquired initial output target bit of each frame image varies with the input bit of the image, which enables the acquired initial output target bit to be more reasonable.

In order to make the acquired output target bit more accurate so as to allocate bits of a video frame more reasonably, according to the embodiment of the present invention, in consideration of various factors such as code rate fluctuation of an image and complexity change of an image, the acquired initial output target bit is optimized to acquire an output target bit, which mainly includes the following steps.

In step 111, a first type of output target bit is acquired according to the initial output target bit and a first type of optimized parameter, which includes the following.

The first type of optimized parameter is:

$\varsigma^j = (R_i/\overline{N_i^{j-1}})/(R_o/\overline{N_{oA}^{j-1}})$, where $\varsigma^j$ denotes a first optimized parameter of an image of the current frame, j denotes the sequence number of a frame, and $\overline{N_{oA}^{j-1}}$ and $\overline{N_i^{j-1}}$ are average actual numbers of bits output and input by encoded previous j−1 frames respectively.

Or, $\gamma^j = (N_i^j \cdot Qstep_i^j / \overline{N_i^{j-1} \cdot Qstep_i^{j-1}})^{1/2}$, where $\gamma^j$ denotes complexity of the current frame image, and $\overline{N_i^{j-1} \cdot Qstep_i^{j-1}}$ denotes average complexity of the encoded previous j−1 frames.

For ease of clear illustration, in the embodiment of the present invention, words such as a first output target bit and a second output target bit are adopted to distinguish obtained results of optimizing the initial output target bit by utilizing an optimized parameter, while the words do not strictly demonstrate the sequence of optimizing.

The first type of output target bit acquired by utilizing the first type of optimized parameter is:

a first output target bit $$N_{o1}^j = N_i^j \cdot \frac{R_o}{R_i} \cdot \varsigma^j,$$

or, a second output target bit $$N_{o2}^j = N_i^j \cdot \frac{R_o}{R_i} \cdot \gamma^j,$$

where, $\gamma^j = (N_i^j \cdot Qstep_i^j / \overline{N_i^{j-1} \cdot Qstep_i^{j-1}})^{1/2}$, where $N_i^j \cdot Qstep_i^j / \overline{N_i^{j-1} \cdot Qstep_i^{j-1}}$ points out complexity of the current frame. Because $N_i^j \cdot Qstep_i^j$ is greater than $\overline{N_i^{j-1} \cdot Qstep_i^{j-1}}$ for a frame with a scenario changed or a frame having a high complexity scenario, more bits are allocated to the frame, while less bits are allocated to a frame with low complexity.

Because $N_i^j \cdot Qstep_i^j / \overline{N_i^{j-1} \cdot Qstep_i^{j-1}}$ can effectively reflect complexity change of each frame in the entire sequence, it is very easy to both detect scenario change and allocate bits. Furthermore, because $N_i^j \cdot Qstep_i^j$ is capable of distinguishing encoding complexity of frame I, P, and B, bit allocation of such three types of frames can uniformly adopt the method.

In step 112, a second type of output target bit is acquired according to the weighted sum of the first type of output target bit. The second type of output target bit is a third output target bit $N_{o3}^j = N_{o1}^j \cdot \lambda + N_{o2}^j \cdot (1-\lambda)$, where λ is a combined weight, and its value range is [0,1].

When a value of λ is neither 0 nor 1, the third output target bit acquired in step 112 is a combination of the first output target bit and the second output target bit. In the embodiment of the present invention, λ is 0.25.

When the value of λ is 0 or 1, the third output target bit acquired in step 112 is a product of the second output target bit or the first output target bit and the third optimized parameter (0 or 1).

In step 113, a third type of output target bit is acquired.

In the embodiment of the present invention, as an example, optimizing the second type of output target bit to acquire a third type of output target bit by selecting three third type of optimized parameters is illustrated. For ease of clear illustration, in the embodiment of the present invention, words such as a fourth output target bit and a fifth output target bit are adopted to distinguish obtained results of optimizing the second type of output target bit by utilizing an optimized parameter, while the words do not strictly demonstrate the sequence of optimizing. In the embodiment of the present invention, when optimizing is performed, using a sequence of the three third type of optimized parameters is only one of technical solutions according to the embodiment of the present invention. The specific method is as follows.

The third type of optimized parameter may be:

Ratio$^j$=(R$_o$/f$_o$)/$\overline{N_{oA}^{j-1}}$, where f$_o$ is an output target frame rate. When the optimizing is performed by adopting such third type of optimized parameter, the acquired third type of output target bit is the fourth output target bit N$_{o4}^j$=N$_{o3}^j$·Ratio$^j$.

That is to say, $$N_{o4}^j = N_i^j \cdot \frac{R_o}{R_i} \cdot (\varsigma^j \cdot \lambda + \gamma^j \cdot (1-\lambda)) \cdot Ratio^j.$$

Additionally, it is considered that an output frame rate is the same as an input frame rate, while input frame rate information is acquired directly from an input code stream, so that $$Ratio^j = \frac{R_o}{f_i} / \overline{N_{oA}^{j-1}} = \left(R_o / \frac{R_i}{N_i^{j-1}}\right) / \overline{N_{oA}^{j-1}} = \frac{R_o \overline{N_i^{j-1}}}{R_i \overline{N_{oA}^{j-1}}}.$$

Or, in order to further optimize an output target bit, in consideration of error between an actual output bit and a target bit, the third type of optimized parameter can further be:

θ$^j$=$\overline{N_{oT}^{j-1}}$/$\overline{N_{oA}^{j-1}}$, where $\overline{N_{oT}^{j-1}}$ is the average output target bit number of encoded previous j−1 frames. When the optimizing is performed once more by adopting the third type of optimized parameter, the acquired fifth type of output target bit is the fifth output target bit N$_{o5}^j$=N$_{o4}^j$·θ$^j$.

When unexpected deviation suddenly occurs for an actual output bit and a target bit of a certain frame, the optimizing in the step is capable of reducing influence on a subsequent frame from such deviation and reducing error between an actual output bit and a target bit of the subsequent frame.

Or, in order that an actually obtained code rate is closer to an output target code rate, the third type of optimized parameter may be:

Para=m−[R$_i$/R$_o$/t]×n, where m, t, and n are parameters, value range of m is [0.8,1.0], n is a positive number not more than 0.1, t is a positive integer, and [ ] denotes round-off. In the embodiment of the present invention, m is 0.90, t is 4, and n is 0.05.

When the optimizing is performed once more by adopting the third type of optimized parameter, the acquired sixth type of output target bit is a sixth output target bit N$_{o6}^j$=N$_{o5}^j$·Para.

According to the embodiment of the present invention, the acquired third type of output target bit is not limited to this, and includes any one of products of the initial output target bit or the first type of output target bit or the second type output target bit and at least one of the third type of optimized parameters.

According to the third type of optimized parameter, an acquired third type of output target bit N$_{op}^j$ is as follows.

According to a product of the initial output target bit and at least one of the third type of optimized parameters, the acquired third type of output target bit is:

N$_{op}^j$=N$_o^j$·Ratio$^j$ or N$_{op}^j$=N$_o^j$·Ratio$^j$·θ$^j$ or
N$_{op}^j$=N$_o^j$·Ratio$^j$·θ$^j$·para or N$_{op}^j$=N$_o^j$·θ$^j$ or
N$_{op}^j$=N$_o^j$·θ$^j$·para or N$_{op}^j$=N$_o^j$·para.

Or, according to a product of the first type of output target bit and at least one of the third type of optimized parameters, the acquired third type of output target bit is:

N$_{op}^j$=N$_{o1}^j$·Ratio$^j$ or N$_{op}^j$=N$_{o1}^j$·Ratio$^j$·θ$^j$ or
N$_{op}^j$=N$_{o1}^j$·Ratio$^j$·θ$^j$·para or N$_{op}^j$=N$_{o1}^j$·θ$^j$ or
N$_{op}^j$=N$_{o1}^j$·θ$^j$·para or N$_{op}^j$=N$_{o1}^j$·para;
or N$_{op}^j$=N$_{o2}^j$·Ratio$^j$ or N$_{op}^j$=N$_{o2}^j$·Ratio$^j$·θ$^j$ or
N$_{op}^j$=N$_{o2}^j$·Ratio$^j$·θ$^j$·para or N$_{op}^j$=N$_{o2}^j$·θ$^j$ or
N$_{op}^j$=N$_{o2}^j$·θ$^j$·para or N$_{op}^j$=N$_{o2}^j$·para.

Or, according to a product of the second type of output target bit and at least one of the third type of optimized parameters, the acquired third type of output target bit is:

N$_{op}^j$=N$_{o3}^j$·Ratio$^j$ or N$_{op}^j$=N$_{o3}^j$·Ratio$^j$·θ$^j$ or
N$_{op}^j$=N$_{o3}^j$·Ratio$^j$·θ$^j$·para or N$_{op}^j$=N$_{o3}^j$·θ$^j$ or
N$_{op}^j$=N$_{o3}^j$·θ$^j$·para or N$_{op}^j$=N$_{o3}^j$·para.

In order to further optimize the output target bit, in consideration of influence of a buffer, the embodiment of the present invention further includes the following steps.

In step 114, a fourth type of output target bit is acquired. The step includes the following steps.

In step S1, an upper limit initial value of an output target bit U(0)=Bs×p is acquired, where p is a parameter, its value range is [0.5,1], and Bs is buffer capacity. In the embodiment of the present invention, p is 0.8.

In step S2, a lower limit initial value) L(0)=R$_o$/f$_o$ of an output target bit is acquired.

Additionally, it is considered that the output frame rate is the same as the input frame rate, while the input frame rate information is acquired directly from the input code stream, so $$L(0) = R_o / f_o = R_o / f_i = N_i^1 \cdot \frac{R_o}{R_i}.$$

In step S3, an upper limit of a current frame target bit is acquired by utilizing the upper limit initial value and U(j)=U(j−1)+R$_o$/f$_o$−N$_{oA}^{j-1}$, where U(j) is upper limit of an output target bit of a j$^{th}$ frame, U(j−1) is upper limit of an output target bit of a (j−1)$^{th}$ frame, and N$_{oA}^{j-1}$ is the actual bit number output by the encoded (j−1)$^{th}$ frame.

Additionally, it is considered that the output frame rate is the same as the input frame rate, while the input frame rate information is acquired directly from the input code stream, so $$U(j)=U(j-1)+R_o/f_o-N_{oA}^{j-1}=U(j-1)+R_o/f_i-N_{oA}^{j-1}=U(j-1)+R_o/(R_i/N_i^{j-1})-N_{oA}^{j-1}.$$

In step S4, a lower limit of the current frame target bit is acquired by utilizing the lower limit initial value and L(j)=L(j−1)+R$_o$/f$_o$−N$_{oA}^{j-1}$, where L(j) is lower limit of an output target bit of a j$^{th}$ frame, L(j−1) is lower limit of an output target bit of a $(j-1)^{th}$ frame, and $N_{oA}^{j-1}$ is the actual bit number output by the encoded $(j-1)^{th}$ frame.

Additionally, it is considered that the output frame rate is the same as the input frame rate, while the input frame rate information is acquired directly from the input code stream, so $$L(j)=L(j-1)+R_o/f_o-N_{oA}^{j-1}=L(j-1)+R_o/f_i-N_{oA}^{j-1}=L(j-1)+R_o/(R_i/N_i^{j-1})-N_{oA}^{j-1}.$$

In step S5, the fourth type of output target bit is acquired by utilizing the upper limit and the lower limit the current frame target bit, and the initial output target bit, or the first type of output target bit or the second type of output target bit or the third type of output target bit. The fourth type of output target bit is $N_{oT}^{j}=\max(\min(N_{os}^{j}, U(j)), L(j))$, where $N_{os}^{j}$ is one of the initial output target bit or the first type of output target bit or the second type output target bit or the third type of output target bit.

In the embodiment of the present invention, the output target bit is one of the initial output target bit or the first type of output target bit or the second type output target bit or the third type of output target bit or the fourth type of output target bit.

A basic idea of the technical solutions according to the present invention at the time of acquiring the output target bit is that, at first the initial output target bit is acquired. Because factors considered when acquiring the initial output target bit are not comprehensive enough, the initial output target bit is not ideal enough. In order to make the acquired output target bit more accurate so as to allocate bits of a video frame more reasonably, according to the embodiment of the present invention, in consideration of various factors such as code rate fluctuation of an image and complexity change of an image, the initial output target bit is optimized by adopting the first type of optimized parameter, weight coefficients or the second type optimized parameter to acquire an output target bit.

Technical solutions according to the present invention include, but are not limited to including the method for acquiring the output target bit described in the method embodiment. For example, the first type of optimized parameter, the weight coefficients and the third type of optimized parameters totally include six optimized parameters, at least one of which is selected to perform computation with the initial output target bit to acquire a first optional output target bit. The first optional output target bit includes the first type of output target bit, the second type of output target bit, and the third type of output target bit. According to the first optional output target bit, or the initial output target bit, the fourth type of output target bit is acquired. If various optimized parameters are selected, limitation is not strictly imposed on the sequence when the selected optimized parameters are utilized to optimize the initial output target bit in turn, and limitation is not strictly imposed on the quantity of the selected various optimized parameters either. However, if considered influential factors are more comprehensive, and selected optimized parameters are more, acquired output target bits are more reasonable.

The embodiment of the present invention further includes the following steps.

In step 12, a target quantization parameter is acquired according to the output target bit by utilizing a nonlinear code rate control model.

In the embodiment of the present invention, the nonlinear code rate control model is a model with a constant product of a code rate and square of a quantization step length: $(Qstep_o^{j})^2 \cdot N_{oT}^{j}=(Qstep_i^{j})^2 \cdot N_i^{j}$, where $Qstep_o^{j}$ is an initial target quantization step length of the current frame, $N_{oT}^{j}$ is the output target bit of the current frame, $Qstep_i^{j}$ is an input quantization step length of the current frame, and $N_i^{j}$ is an input bit of the current frame.

Step 12 includes the following steps.

In step T1, the initial target quantization step length $Qstep_o^{j}=Qstep_i^{j}(N_i^{j}/N_{oT}^{j})^{1/2}$ is acquired according to the nonlinear code rate control model.

In step T2, the initial target quantization step length is optimized so as to acquire an optimized target quantization step length $Qstep_{o1}^{j}=Qstep_o^{j} \cdot \alpha^{j} \cdot \beta^{j}$, where $\alpha^{j}=\overline{Qstep_{o1}^{j-1} \cdot (N_{oA}^{j-1})^{1/2}}/\overline{Qstep^{ij-1} \cdot (N_i^{j-1})^{1/2}}$, and $\beta^{j}=\overline{(N_{oA}^{j-1}/N_i^{j-1})}/(N_{oT}^{j}/N_i^{j})$.

In step T3, a quantization parameter table is looked up according to the initial target quantization step length or the optimized target quantization step length so as to acquire the target quantization parameter.

A quantization parameter table in the H.264 standard is looked up according to the acquired initial or optimized target quantization step length so as to find a quantization step length that is closest to the acquired initial or optimized target quantization parameter in the quantization parameter table. The target quantization parameter includes the sequence number corresponding to the quantization step length in the quantization parameter table.

In the embodiment of the present invention, a compression format of an input code stream is one of MPEG-2, MPEG-4, H.261 or H.263, and compression format of an output code stream is H.264.

According to the embodiment of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiments of the present invention perform transcoding, the target bandwidth can be satisfied and the code stream quality can also be guaranteed to accurately control the code rate.

In an embodiment, the present invention further provides a device for controlling a code rate, which is capable of both satisfying target bandwidth and guaranteeing code stream quality to accurately control the code rate.

Figure 3:
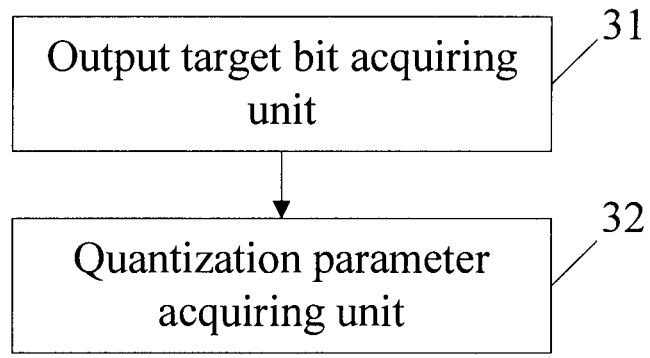
FIG. 3 is a schematic view of a device for controlling a code rate according to a first embodiment of the present invention.

FIG. 3 is a schematic view of a device for controlling a code rate. As shown in FIG. 3, the device includes an output target bit acquiring unit 31 and a quantization parameter acquiring unit 32.

The output target bit acquiring unit 31 is configured to acquire an output target bit of a current frame, where the current frame is a currently processed input frame.

The quantization parameter acquiring unit 32 is configured to acquire a target quantization parameter according to the output target bit acquired by the output target bit acquiring unit 31 by utilizing a nonlinear code rate control model.

According to the embodiment of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiments of the present invention perform transcoding, the target bandwidth can be satisfied and the code stream quality can also be guaranteed to accurately control the code rate.

Figure 4:
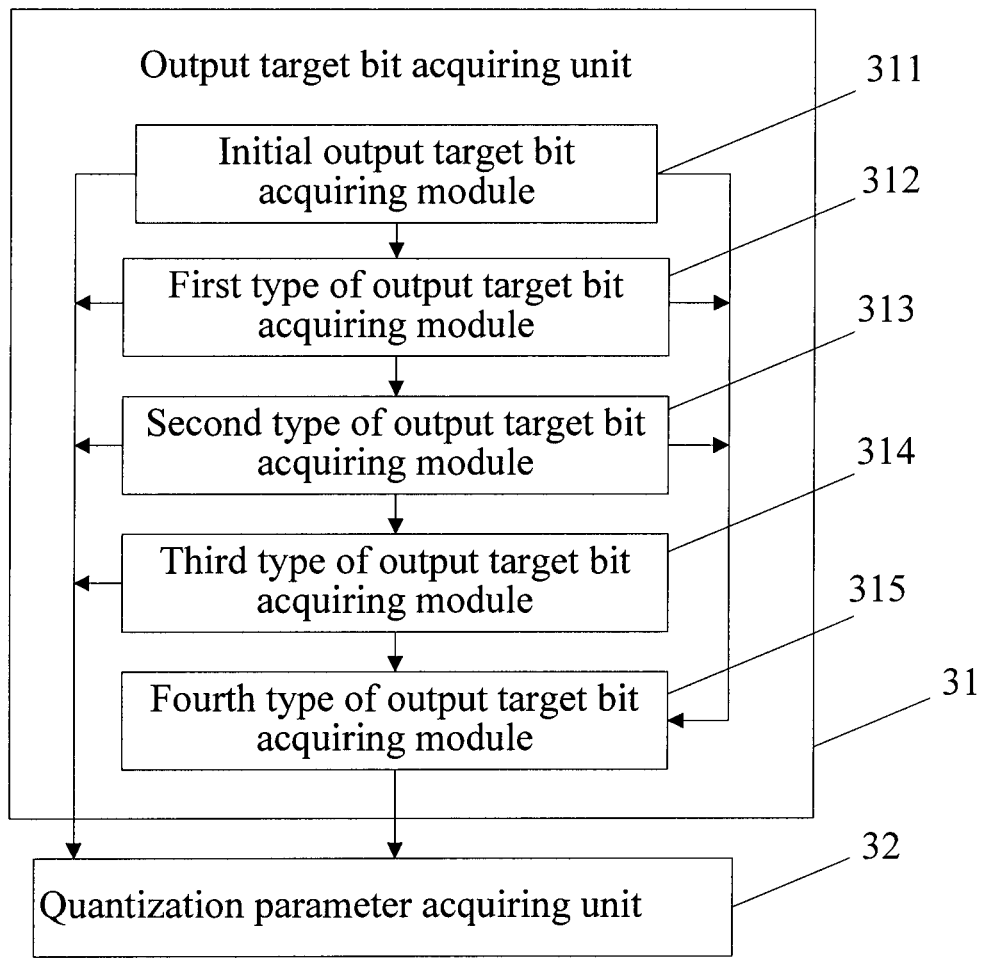
FIG. 4 is a schematic view of a device for controlling a code rate according to a second embodiment of the present invention.

In the embodiment of the present invention, as shown in FIG. 4, the output target bit acquiring unit 31 includes an initial output target bit acquiring module 311.

The initial output target bit acquiring module 311 is configured to acquire an initial output target bit $$N_o^j = N_i^j \cdot \frac{R_o}{R_i}$$

according to output target bandwidth, input bandwidth and the input bit of the current frame, where $N_o^j$ is the initial output target bit of the current frame, $N_i^j$ is the input bit of the current frame, $R_o$ is output target bandwidth, and $R_i$ is input bandwidth.

In order to make the acquired output target bit more accurate so as to allocate bits of a video frame more reasonably, the initial output target bit is optimized so as to obtain an output target bit.

As shown in FIG. 4, the output target bit acquiring unit 31 further includes a first type of output target bit acquiring module 312.

The first type of output target bit acquiring module 312 is configured to acquire a first type of output target bit according to the initial output target bit and a first type of optimized parameter. The first type of optimized parameter is:

$\varsigma^j = (R_i/\overline{N_i^{j-1}})/R_o\overline{N_{oA}^{j-1}})$, where $\varsigma^j$ denotes a first optimized parameter of an image of the current frame, j denotes the sequence number of a frame, and $\overline{N_{oA}^{j-1}}$ and $\overline{N_i^{j-1}}$ are average actual numbers of bits output and input by encoded previous j−1 frames respectively.

Or, $\gamma^j = (N_i^j \cdot Qstep_i^j / \overline{N_i^{j-1} \cdot Qstep_i^{j-1}})^{1/2}$, where $\gamma^j$ denotes complexity of the current frame image, and $\overline{N_i^{j-1} \cdot Qstep_i^{j-1}}$ denotes average complexity of the encoded previous j−1 frames.

The acquired first type of output target bit is:

$$N_{o1}^j = N_i^j \cdot \frac{R_o}{R_i} \cdot \varsigma^j, \text{ or, } N_{o2}^j = N_i^j \cdot \frac{R_o}{R_i} \cdot \gamma^j.$$

The output target bit acquiring unit 31 further includes a second type of output target bit acquiring module 313.

The second type of output target bit acquiring module 313 is configured to weigh and acquire a second type of output target bit according to the first type of output target bit. The second type of output target bit is $N_{o3}^j = N_{o1}^j \cdot \lambda + N_{o2}^j \cdot (1-\lambda)$, where λ is a combined weight, and its value range is [0,1].

The output target bit acquiring unit 31 further includes a third type of output target bit acquiring module 314.

The third type of output target bit acquiring module 314 is configured to acquire a third type of output target bit according to a product of the initial output target bit and at least one of a third type of optimized parameters. The third type of optimized parameter is:

Ratio$^j$ = $(R_o/f_o)/\overline{N_{oA}^{j-1}}$, where $f_o$ is an output target frame rate.

Or, the third type of optimized parameter is:

$\theta^j = \overline{N_{oT}^{j-1}}/\overline{N_{oA}^{j-1}}$, where $\overline{N_{oT}^{j-1}}$ is the average output target bit number of encoded previous j−1 frames; or, the third type of optimized parameter is:

Para=m−[$(R_i/R_o)/t]×n$, where m, t, and n are parameters, value range of m is [0.8,1.0], n is a positive number not more than 0.1, t is a positive integer, and [ ] denotes round-off.

The acquired third type of output target bit $N_{op}^j$ is:
$N_{op}^j = N_o^j \cdot$ Ratio$^j$ or $N_{op}^j = N_o^j \cdot$ Ratio$^j \cdot \theta^j$ or
$N_{op}^j = N_o^j \cdot$ Ratio$^j \cdot \theta^j \cdot$ para or $N_{op}^j = N_o^j \cdot \theta^j$ or
$N_{op}^j = N_o^j \cdot \theta^j \cdot$ para or $N_{op}^j = N_o^j \cdot$ para.

Or, the third type of output target bit acquiring module 314 is further configured to acquire a third type of output target bit according to a product of the first type of output target bit and at least one of the third type of optimized parameters.

The third type of optimized parameter is:

Ratio$^j$ = $(R_o/f_o)/\overline{N_{oA}^{j-1}}$, where $f_o$ is an output target frame rate.

Or, the third type of optimized parameter is:

$\theta^j = \overline{N_{oT}^{j-1}}/\overline{N_{oA}^{j-1}}$, where $\overline{N_{oT}^{j-1}}$ is the average output target bit number of encoded previous j−1 frames; or, the third type of optimized parameter is:

Para=m−[$(R_i/R_o)/t]×n$, where m, t, and n are parameters, value range of m is [0.8,1.0], n is a positive number not more than 0.1, t is a positive integer, and [ ] denotes round-off.

The acquired third type of output target bit $N_{op}^j$ is:
$N_{op}^j = N_{o1}^j \cdot$ Ratio$^j$ or $N_{op}^j = N_{o1}^j \cdot$ Ratio$^j \cdot \theta^j$ or
$N_{op}^j = N_{o1}^j \cdot$ Ratio$^j \cdot \theta^j \cdot$ para or $N_{op}^j = N_{o1}^j \cdot \theta^j$ or
$N_{op}^j = N_{o1}^j \cdot \theta^j \cdot$ para or $N_{op}^j = N_{o1}^j \cdot$ para;
or $N_{op}^j = N_{o2}^j \cdot$ Ratio$^j$ or $N_{op}^j = N_{o2}^j \cdot$ Ratio$^j \cdot \theta^j$ or
$N_{op}^j = N_{o2}^j \cdot$ Ratio$^j \cdot \theta^j \cdot$ para or $N_{op}^j = N_{o2}^j \cdot \theta^j$ or
$N_{op}^j = N_{o2}^j \cdot \theta^j \cdot$ para or $N_{op}^j = N_{o2}^j \cdot$ para.

Or, the third type of output target bit acquiring module 314 is further configured to acquire the third type of output target bit according to a product of the second type of output target bit and at least one of the third type of optimized parameters.

The third type of optimized parameter is:

Ratio$^j$ = $(R_o/f_o)/\overline{N_{oA}^{j-1}}$, where $f_o$ is an output target frame rate.

Or, the third type of optimized parameter is:

$\theta^j = \overline{N_{oT}^{j-1}}/\overline{N_{oA}^{j-1}}$, where $\overline{N_{oT}^{j-1}}$ is the average output target bit number of encoded previous j−1 frames; or, the third type of optimized parameter is:

Para=m−[$(R_i/R_o)/t]×n$, where m, t, and n are parameters, value range of m is [0.8,1.0], n is a positive number not more than 0.1, t is a positive integer, and [ ] denotes round-off.

The acquired third type of output target bit $N_{op}^j$ is:
$N_{op}^j = N_{o3}^j \cdot$ Ratio$^j$ or $N_{op}^j = N_{o3}^j \cdot$ Ratio$^j \cdot \theta^j$ or
$N_{op}^j = N_{o3}^j \cdot$ Ratio$^j \cdot \theta^j \cdot$ para or $N_{op}^j = N_{o3}^j \cdot \theta^j$ or
$N_{op}^j = N_{o3}^j \cdot \theta^j \cdot$ para or $N_{op}^j = N_{o3}^j \cdot$ para.

The output target bit acquiring unit 31 further includes a fourth type of output target bit acquiring module 315. The fourth type of output target bit acquiring module 315 is configured to acquire an upper limit initial value of an output target bit U(0)=Bs×p, where p is a parameter, its value range is [0.5,1], and Bs is buffer capacity; and acquire a lower limit initial value of an output target bit L(0)=$R_o/f_o$;

acquire an upper limit of a current frame target bit by utilizing the upper limit initial value and U(j)=U(j−1)+$R_o/f_o$−$N_{oAj-1}$, where U(j) is upper limit of an output target bit of a $j^{th}$ frame, U(j−1) is upper limit of an output target bit of a (j−1)$^{th}$ frame, and $N_{oA}^{j-1}$ is the actual bit number output by the encoded (j−1)$^{th}$ frame;

acquire a lower limit of a current frame target bit by utilizing the lower limit initial value and L(j)=L(j−1)+$R_o/f_o$−$N_{oA}^{j-1}$, where L(j) is lower limit of an output target bit of a $j^{th}$ frame, L(j−1) is lower limit of an output target bit of a (j−1)$^{th}$ frame, and $N_{oA}^{j-1}$ is the actual bit number output by the encoded (j−1)$^{th}$ frame; and acquire a fourth type of output target bit by utilizing the upper limit and the lower limit the current frame target bit, and the initial output target bit, or the first type of output target bit or the second type of output target bit or the third type of output target bit, where the fourth type of output target bit is $N_{oT}^{j}$=max(min($N_{os}^{j}$, U(j)), L(j)), where $N_{os}^{j}$ is one of the initial output target bit or the first type of output target bit or the second type output target bit or the third type of output target bit.

The output target bit acquiring unit 31 includes at least one of the initial output target bit acquiring module 311, the first type of output target bit acquiring module 312, the second type output target bit acquiring module 313, the third type of output target bit acquiring module 314, and the fourth type of output target bit acquiring module 315. The schematic view of the device for controlling a code rate according to the embodiment of the present invention as shown in FIG. 4 only includes one case, that is, includes all of the five modules.

In the embodiment of the present invention, the quantization parameter acquiring unit 32 includes an initial target quantization step length acquiring module, an optimization acquiring module, and an acquiring module.

The initial target quantization step length acquiring module is configured to acquire an initial target quantization step length $Qstep_o^j = Qstep_i^j (N_i^j/N_{oT}^j)^{1/2}$ according to the nonlinear code rate control model.

The optimization acquiring module is configured to optimize the initial target quantization step length so as to acquire an optimized target quantization step length $Qstep_{o1}^j = Qstep_o^j \cdot \alpha^j \cdot \beta^j$, where $\alpha^j = \overline{Qstep_{o1}^{j-1} \cdot (N_{oA}^{j-1})^{1/2}}/\overline{Qstep_i^{j-1} \cdot (N_i^{j-1})^{1/2}}$, and $\beta^j = (\overline{N_{oA}^{j-1}/N_i^{j-1}})/(N_{oT}^j/N_i^j)$.

The acquiring module is configured to look up a quantization parameter table according to the initial target quantization step length or the optimized target quantization step length so as to acquire the target quantization parameter.

According to the embodiment of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiments of the present invention perform transcoding, the target bandwidth can be satisfied and the code stream quality can also be guaranteed to accurately control the code rate.

In an embodiment, the present invention further provides a transcoder, which is capable of both satisfying target bandwidth and guaranteeing code stream quality to accurately control the code rate.

Figure 5:
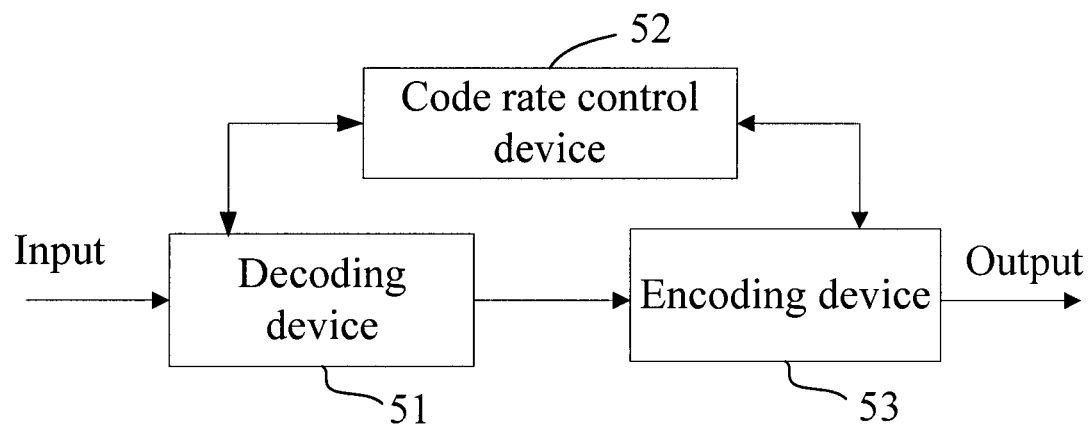
FIG. 5 is a schematic view of a transcoder according to an embodiment of the present invention.

FIG. 5 is a schematic view of a transcoder. As shown in FIG. 5, the transcoder includes a decoding device 51, a code rate control device 52, and an encoding device 53.

The decoding device 51 is configured to acquire input transcoding information of an input video code stream.

The code rate control device 52 is configured to acquire an output target bit according to output transcoding information and the input transcoding information acquired by the decoding device 51, and acquire a target quantization parameter of an output end according to a nonlinear code rate control model by utilizing the output target bit.

The encoding device 53 is configured to perform encoding according to the target quantization parameter acquired by the code rate control device 52 to generate an output code stream.

The input transcoding information includes bandwidth of an input code stream, a frame rate, the bit number of each frame, and quantization step length. The output transcoding information includes bandwidth of an output code stream, a frame rate, the target bit number of each frame, and target quantization step length. The bandwidth in the output transcoding information is configured by a system or user, the frame rate is configured by the system or user or determined according to the input code stream, and the target bit number of each frame and the target quantization step length is set by the code rate control device 52.

The nonlinear code rate control model is a model with a constant product of a code rate and square of a quantization step length: $(Qstep_o^j)^2 \cdot N_{oT}^j = (Qstep_i^j)^2 \cdot N_i^j$, where $Qstep_o^j$ is an initial target quantization step length of a current processing frame, $N_{oT}^j$ is an output target bit of the current processing frame, $Qstep_i^j$ is an input quantization step length of the current processing frame, and $N_i^j$ is an input bit of the current processing frame.

In the embodiment of the present invention, a compression format of an input code stream is one of MPEG-2, MPEG-4, H.261 or H.263, and compression format of an output code stream is H.264.

According to the embodiment of the present invention, when video transcoding is performed, in full consideration of difference among encoding manners of different encoding standards and by adopting a nonlinear code rate control model, a more precise target quantization parameter can be acquired, so as to solve problems that when transcoding from MPEG-2, MPEG-4, H.261, and H.263 to H.264 is performed in the prior art, the acquired target quantization parameter error is grave, the acquired code stream quality is not high, and code rate control is not accurate because of adopting a linear code rate control model. Hence, when the technical solutions according to the embodiments of the present invention perform transcoding, the target bandwidth can be satisfied and the code stream quality can also be guaranteed to accurately control the code rate.

It should be noted, the method for controlling a code rate according to the present invention can be further applied in an encoder. The input video code stream can be from a result output by last encoding of the encoder, which is used for an operation of two-pass encoding. However, without being limited to this, the method for controlling a code rate can be applied to any scenario which needs code rate control.

Persons having ordinary skill in the art can understand that, all or part of the steps according to the embodiments of the present invention may be implemented by a program instructing relevant hardware. Software corresponding to the embodiments may be stored in a computer readable storage medium.

Definitely, further various embodiments of the present invention can be present.

Without departing from spirit and essence of the embodiments of the present invention, persons skilled in the art can make various corresponding changes and transformations according to the embodiments of the present invention, but these corresponding changes and transformations should all fall within the protection scope of the appended claims according to the embodiments of the present invention.

What is claimed is:

1. A method for controlling a code rate, comprising:
   acquiring an output target bit of a current frame, wherein the current frame is a currently processed input frame; and
   acquiring a target quantization parameter according to the output target bit by utilizing a nonlinear code rate control model, wherein the nonlinear code rate control model is a model with a constant product of a code rate and square of a quantization step length: $(Qstep_o^j)^2 \cdot N_{oT}^j = (Qstep_i^j)^2 \cdot N_i^j$, wherein $Qstep_o^j$ is an initial target quantization step length of the current frame, $N_{oT}^j$ is the output target bit of the current frame, $Qstep_i^j$ is an input quantization step length of the current frame, and $N_i^j$ is an input bit of the current frame.

2. The method for controlling a code rate according to claim 1, wherein the acquiring the output target bit of the current frame comprises:
   acquiring an initial output target bit $$N_o^j = N_i^j \cdot \frac{R_o}{R_i}$$

according to input bandwidth, output target bandwidth and the input bit of the current frame, wherein $N_o^j$ is the initial output target bit of the current frame, $N_i^j$ is the input bit of the current frame, $R_o$ is output target bandwidth, and $R_i$ is input bandwidth.

3. The method for controlling a code rate according to claim 2, further comprising:
   acquiring a first type of output target bit according to the initial output target bit and a first type of optimized parameter, wherein the first type of optimized parameter is:
   $\varsigma^j = (R_i/\overline{N_i^{j-1}})/(R_o/\overline{N_{oA}^{j-1}})$, wherein $\varsigma^j$ denotes a first optimized parameter of an image of the current frame, j denotes the sequence number of a frame, and $\overline{N_{oA}^{j-1}}$ and $\overline{N_i^{j-1}}$ are average actual numbers of bits output and input by encoded previous j−1 frames respectively;
   or, the first type of optimized parameter is $\gamma^j = (N_i^j \cdot Qstep_i^j / \overline{N_i^{j-1} \cdot Qstep_i^{j-1}})^{1/2}$, wherein $\gamma^j$ denotes complexity of the current frame image, and $\overline{N_i^{j-1} \cdot Qstep_i^{j-1}}$ denotes average complexity of the encoded previous j−1 frames;
   the acquired first type of output target bit is a first output target bit $$N_{o1}^j = N_i^j \cdot \frac{R_o}{R_i} \cdot \varsigma^j;$$

or, the first type of output target bit is a second output target bit $$N_{o2}^j = N_i^j \cdot \frac{R_o}{R_i} \cdot \gamma^j.$$

4. The method for controlling a code rate according to claim 3, further comprising:
   acquiring a second type of output target bit according to the weighted sum of the first type of output target bit, wherein the second type of output target bit is $N_{o3}^j = N_{o1}^j \cdot \lambda + N_{o2}^j \cdot (1-\lambda)$, wherein $\lambda$ is a combined weight, and its value range is [0,1].

5. The method for controlling a code rate according to claim 2, further comprising:
   acquiring a third type of output target bit according to a product of the initial output target bit and at least one of a third type of optimized parameters, wherein
   the third type of optimized parameter is:
   $Ratio^j = (R_o/f_o)/\overline{N_{oA}^{j-1}}$, wherein $f_o$ is an output target frame rate;
   or, the third type of optimized parameter is:
   $\theta^j = \overline{N_{oT}^{j-1}}/\overline{N_{oA}^{j-1}}$, wherein $\overline{N_{oT}^{j-1}}$ is the average output target bit number of encoded previous j−1 frames;
   or, the third type of optimized parameter is:
   Para = $m - [(R_i/R_o)/t] \times n$, wherein m, t, and n are parameters, value range of m is [0.8,1.0], n is a positive number not more than 0.1, t is a positive integer, and [ ] denotes round-off;
   the acquired third type of output target bit $N_{op}^j$ is:
   $N_{op}^j = N_o^j \cdot Ratio^j$ or $N_{op}^j = N_o^j \cdot Ratio^j \cdot \theta^j$ or
   $N_{op}^j = N_o^j \cdot Ratio^j \cdot \theta^j \cdot para$ or $N_{op}^j = N_o^j \cdot \theta^j$ or
   $N_{op}^j = N_o^j \cdot \theta^j \cdot para$ or $N_{op}^j = N_o^j \cdot para$.

6. The method for controlling a code rate according to claim 3, further comprising:
   acquiring a third type of output target bit according to a product of the first type of output target bit and at least one of a third type of optimized parameters, wherein
   the third type of optimized parameter is:
   $Ratio^j = (R_o/f_o)/\overline{N_{oA}^{j-1}}$, wherein $f_o$ is an output target frame rate;
   or, the third type of optimized parameter is:
   $\theta^j = \overline{N_{oT}^{j-1}}/\overline{N_{oA}^{j-1}}$, wherein $\overline{N_{oT}^{j-1}}$ is the average output target bit number of encoded previous j−1 frames; or, the third type of optimized parameter is:
   Para = $m - [(R_i/R_o)/t] \times n$, wherein m, t, and n are parameters, value range of m is [0.8,1.0], n is a positive number not more than 0.1, t is a positive integer, and [ ] denotes round-off;
   the acquired third type of output target bit $N_{op}^j$ is:
   $N_{op}^j = N_{o1}^j \cdot Ratio^j$ or $N_{op}^j = N_{o1}^j \cdot Ratio^j \cdot \theta^j$ or
   $N_{op}^j = N_{o1}^j \cdot Ratio^j \cdot \theta^j \cdot para$
   or $N_{op}^j = N_{o1}^j \cdot \theta^j$ or $N_{op}^j = N_{o1}^j \cdot \theta^j \cdot para$ or
   $N_{op}^j = N_{o1}^j \cdot para$;
   or $N_{op}^j = N_{o2}^j \cdot Ratio^j$ or $N_{op}^j = N_{o2}^j \cdot Ratio^j \cdot \theta^j$ or
   $N_{op}^j = N_{o2}^j \cdot Ratio^j \cdot \theta^j \cdot para$
   or $N_{op}^j = N_{o2}^j \cdot \theta^j$ or $N_{op}^j = N_{o2}^j \cdot \theta^j \cdot para$ or
   $N_{op}^j = N_{o2}^j \cdot para$.

7. The method for controlling a code rate according to claim 4, further comprising:
   acquiring a third type of output target bit according to a product of the second type of output target bit and at least one of a third type of optimized parameters, wherein
   the third type of optimized parameter is:
   $Ratio^j = (R_o/f_o)/\overline{N_{oA}^{j-1}}$, wherein $f_o$ is an output target frame rate; or, the third type of optimized parameter is:
   $\theta^j = \overline{N_{oT}^{j-1}}/\overline{N_{oA}^{j-1}}$, wherein $\overline{N_{oT}^{j-1}}$ is the average output target bit number of encoded previous j−1 frames; or, the third type of optimized parameter is:
   Para = $m - [(R_i/R_o)/t] \times n$, wherein m, and n are parameters, value range of m is [0.8,1.0], n is a positive number not more than 0.1, t is a positive integer, and [ ] denotes round-off;
   the acquired third type of output target bit $N_{op}^j$ is:
   $N_{op}^j = N_{o3}^j \cdot Ratio^j$ or $N_{op}^j = N_{o3}^j \cdot Ratio^j \cdot \theta^j$ or
   $N_{op}^j = N_{o3}^j \cdot Ratio^j \cdot \theta^j \cdot para$ or $N_{op}^j=N_{o3}^j\cdot\theta^j$ or $N_{op}^j=N_{o3}^j\cdot\theta^j\cdot\text{para}$ or $N_{op}^j=N_{o3}^j\cdot\text{para}$.

8. The method for controlling a code rate according to claim 7, further comprising:

acquiring an upper limit initial value of an output target bit $U(0)=Bs \times p$, wherein p is a parameter, its value range is [0.5,1], and Bs is buffer capacity;

acquiring a lower limit initial value of an output target bit $L(0)=R_o/f_o$;

acquiring upper limit of a current frame target bit by utilizing the upper limit initial value and $U(j)=U(j-1)+R_o/f_o-N_{oA}^{j-1}$, wherein $U(j)$ is upper limit of an output target bit of a jth frame, $U(j-1)$ is upper limit of an output target bit of a (j-1)th frame, and $N_{oAj-1}$ is an actual bit number output by encoded (j-1)th frame;

acquiring lower limit of the current frame target bit by utilizing the lower limit initial value and $L(j)=L(j-1)+R_o/f_o-N_{oA}^{j-1}$, wherein $L(j)$ is lower limit of an output target bit of a jth frame, $L(j-1)$ is lower limit of an output target bit of a (j-1)th frame, and $N_{oA}^{j-1}$ is the actual bit number output by the encoded (j-1)th frame; and acquiring a fourth type of output target bit by utilizing the upper limit and the lower limit the current frame target bit, and the initial output target bit, or the first type of output target bit or the second type of output target bit or the third type of output target bit, wherein the fourth type of output target bit is $N_{oT}^j=\max(\min(N_{os}^j, U(j)), L(j))$, wherein $N_{os}^j$ is the initial output target bit or the first type of output target bit or the second type output target bit or the third type of output target bit, wherein the output target bit is one of the initial output target bit or the first type of output target bit or the second type output target bit or the third type of output target bit or the fourth type of output target bit.

9. The method for controlling a code rate according to claim 8, wherein the acquiring the target quantization parameter according to the output target bit by utilizing the nonlinear code rate control model comprises:

acquiring an initial target quantization step length $Qstep_o^j=Qstep_i^j(N_i^j/N_{oT}^j)^{1/2}$ according to the nonlinear code rate control model;

optimizing the initial target quantization step length so as to acquire an optimized target quantization step length $Qstep_{o1}^j=Qstep_o^j\cdot\alpha^j\beta^j$, wherein $\alpha^j=\overline{Qstep_{o1}^{j-1}\cdot(N_{oA}^{j-1})^{1/2}}/\overline{Qstep_i^{j-1}\cdot(N_i^{j-1})^{1/2}}$, and $\beta^j=(\overline{N_{oA}^{j-1}}/\overline{N_i^{j-1}})/(N_{oT}^j/N_i^j)$; and looking up a quantization parameter table according to the initial target quantization step length or the optimized target quantization step length, so as to acquire the target quantization parameter.

10. A device for controlling a code rate, comprising:

an output target bit acquiring unit, configured to acquire an output target bit of a current frame, wherein the current frame is a currently processed input frame; and a quantization parameter acquiring unit, configured to acquire a target quantization parameter according to the output target bit acquired by the output target bit acquiring unit by utilizing a nonlinear code rate control model, wherein the nonlinear code rate control model is a model with a constant product of a code rate and square of a quantization step length: $(Qstep_o^j)^2\cdot N_{oT}^j=(Qstep_i^j)^2\cdot N_i^j$, wherein $Qstep_o^j$ is an initial target quantization step length of the current frame, $N_{oT}^j$ is the output target bit of the current frame, $Qstep_i^j$ is an input quantization step length of the current frame, and $N_i^j$ is an input bit of the current frame.

11. The device for controlling a code rate according to claim 10, wherein the output target bit acquiring unit comprises:

an initial output target bit acquiring module, configured to acquire an initial output target bit $$N_o^j = N_i^j \cdot \frac{R_o}{R_i}$$

according to input bandwidth, output target bandwidth and the input bit of the current frame, wherein $N_o^j$ is the initial output target bit of the current frame, $N_i^j$ is the input bit of the current frame, $R_o$ is output target bandwidth, and $R_i$ is input bandwidth.

12. The device for controlling a code rate according to claim 11, wherein the output target bit acquiring unit further comprises:

a first type of output target bit acquiring module, configured to acquire a first type of output target bit according to the initial output target bit and a first type of optimized parameter, wherein the first type of optimized parameter is:

$\varsigma^j=(R_i/\overline{N_i^{j-1}})/(R_o/\overline{N_{oA}^{j-1}})$, wherein $\varsigma^j$ denotes a first optimized parameter of an image of the current frame, j denotes the sequence number of a frame, and $\overline{N_{oA}^{j-1}}$ and $\overline{N_i^{j-1}}$ are average actual numbers of bits output and input by encoded previous j-1 frames respectively;

or, the first type of optimized parameter is $\gamma^j=(N_i^j\cdot Qstep_i^j/\overline{N_i^{j-1}\cdot Qstep_i^{j-1}})^{1/2}$, wherein $\gamma^j$ denotes complexity of the current frame image, and $\overline{N_i^{j-1}\cdot Qstep_i^{j-1}}$ denotes average complexity of the encoded previous j-1 frames; and the acquired first type of output target bit is:

$$N_{o1}^j = N_i^j \cdot \frac{R_o}{R_i} \cdot \varsigma^j, \text{ or, } N_{o2}^j = N_i^j \cdot \frac{R_o}{R_i} \cdot \gamma^j.$$

13. The device for controlling a code rate according to claim 12, wherein the output target bit acquiring unit further comprises:

a second type of output target bit acquiring module, configured to acquire a second type of output target bit according to the weighted sum of the first type of output target bit, wherein the second type of output target bit is $N_{o3}^j=N_{o1}^j\cdot\lambda+N_{o2}^j\cdot(1-\lambda)$, wherein $\lambda$ is a combined weight, and its value range is [0,1].

14. The device for controlling a code rate according to claim 11, wherein the output target bit acquiring unit further comprises:

a third type of output target bit acquiring module, configured to acquire a third type of output target bit according to a product of the initial output target bit and at least one of a third type of optimized parameters, wherein the third type of optimized parameter is:

$\text{Ratio}^j=(R_o/f_o)/\overline{N_{oA}^{j-1}}$, wherein $f_o$ is an output target frame rate;

or, the third type of optimized parameter is:

$\theta^j=\overline{N_{oT}^{j-1}}/\overline{N_{oA}^{j-1}}$, wherein $\overline{N^{oTj-1}}$ is the average output target bit number of encoded previous j-1 frames;

or, the third type of optimized parameter is:

$\text{Para}=m-[(R_i/R_o)/t]\times n$, wherein m, t, and n are parameters, value range of m is [0.8,1.0], n is a positive number not more than 0.1, t is a positive integer, and [ ] denotes round-off; and the acquired third type of output target bit $N_{op}^j$ is:
$N_{op}^j = N_o^j \cdot Ratio^j$ or $N_{op}^j = N_o^j \cdot Ratio^j \cdot \theta^j$ or $N_{op}^j = N_o^j \cdot Ratio^j \cdot \theta^j \cdot para$
or $N_{op}^j = N_o^j \cdot \theta^j$ or $N_{op}^j = N_o^j \cdot \theta^j \cdot para$ or $N_{op}^j = N_o^j \cdot para$.

15. The device for controlling a code rate according to claim 12, wherein the output target bit acquiring unit comprises:

a third type of output target bit acquiring module, further configured to acquire a third type of output target bit according to a product of the first type of output target bit and at least one of a third type of optimized parameters, wherein the third type of optimized parameter is:
$Ratio^j = (R_o/f_o)/\overline{N_{oA}^{j-1}}$, wherein $f_o$ is an output target frame rate;

or, the third type of optimized parameter is:
$\theta^j = \overline{N_{oT}^{j-1}}/\overline{N_{oA}^{j-1}}$, wherein $\overline{N_{oT}^{j-1}}$ is the average output target bit number of encoded previous j−1 frames;

or, the third type of optimized parameter is:
Para=$m-[(R_i/R_o)/t] \times n$, wherein m, t, and n are parameters, value range of m is [0.8,1.0], n is a positive number not more than 0.1, t is a positive integer, and [ ] denotes round-off; and the acquired third type of output target bit $N_{op}^j$ is:
$N_{op}^j = N_{o1}^j \cdot Ratio^j$ or $N_{op}^j = N_{o1}^j \cdot Ratio^j \cdot \theta^j$ or $N_{op}^j = N_{o1}^j \cdot Ratio^j \cdot \theta^j \cdot para$
or $N_{op}^j = N_{o1}^j \cdot \theta^j$ or $N_{op}^j = N_{o1}^j \cdot \theta^j \cdot para$ or $N_{op}^j = N_{o1}^j \cdot para$;
or $N_{op}^j = N_{o2}^j \cdot Ratio^j$ or $N_{op}^j = N_{o2}^j \cdot Ratio^j \cdot \theta^j$ or $N_{op}^j = N_{o2}^j \cdot Ratio^j \cdot \theta^j \cdot para$
or $N_{op}^j = N_{o2}^j \cdot \theta^j$ or $N_{op}^j = N_{o2}^j \cdot \theta^j \cdot para$ or $N_{op}^j = N_{o2}^j \cdot para$.

16. The device for controlling a code rate according to claim 13, wherein the output target bit acquiring unit further comprises:

a third type of output target bit acquiring module, further configured to acquire a third type of output target bit according to a product of the second type of output target bit and at least one of a third type of optimized parameters, wherein the third type of optimized parameters is:
$Ratio^j = (R_o/f_o)/\overline{N_{oA}^{j-1}}$, wherein $f_o$ is an output target frame rate;

or, the third type of optimized parameter is:
$\theta^j = \overline{N_{oT}^{j-1}}/\overline{N_{oA}^{j-1}}$, wherein $\overline{N_{oT}^{j-1}}$ is the average output target bit number of encoded previous j−1 frames;

or, the third type of optimized parameter is:
Para=$m-[(R_i/R_o)/t] \times n$, wherein m, t, and n are parameters, value range of m is [0.8,1.0], n is a positive number not more than 0.1, t is a positive integer, and [ ] denotes round-off; and the acquired third type of output target bit $N_{op}^j$ is:
$N_{op}^j = N_{o3}^j \cdot Ratio^j$ or $N_{op}^j = N_{o3}^j \cdot Ratio^j \cdot \theta^j$ or $N_{op}^j = N_{o3}^j \cdot Ratio^j \cdot \theta^j \cdot para$
or $N_{op}^j = N_{o3}^j \cdot \theta^j$ or $N_{op}^j = N_{o3}^j \cdot \theta^j \cdot para$ or $N_{op}^j = N_{o3}^j \cdot para$.

17. The device for controlling a code rate according to claim 16, wherein the output target bit acquiring unit further comprises:

a fourth type of output target bit acquiring module, configured to acquire an upper limit initial value of an output target bit $U(0) = B_s \times p$, wherein p is a parameter, its value range is [0.5,1], and $B_s$ is buffer capacity; acquire a lower limit initial value of an output target bit $L(0) = R_o/f_o$; acquire upper limit of a current frame target bit by utilizing the upper limit initial value and $U(j) = U(j-1) + R_o/f_o - N_{oA}^{j-1}$, wherein U(j) is upper limit of an output target bit of a $j^{th}$ frame, U(j−1) is upper limit of an output target bit of a $(j-1)^{th}$ frame, and $N_{oA}^{j-1}$ is the actual bit number output by the encoded $(j-1)^{th}$ frame; acquire lower limit of the current frame target bit by utilizing the lower limit initial value and $L(j) = L(j-1) + R_o/f_o - N_{oA}^{j-1}$, wherein L(j) is lower limit of an output target bit of a $j^{th}$ frame, L(j−1) is lower limit of an output target bit of a $(j-1)^{th}$ frame, and $N_{oA}^{j-1}$ is the actual bit number output by the encoded $(j-1)^{th}$ frame; and acquire a fourth type of output target bit by utilizing the upper limit and the lower limit the current frame target bit, and the initial output target bit, or the first type of output target bit or the second type of output target bit or the third type of output target bit, wherein the fourth type of output target bit is $N_{oT}^j = \max(\min(N_{os}^j, U(j)), L(j))$, wherein $N_{os}^j$ is one of the initial output target bit or the first type of output target bit or the second type output target bit or the third type of output target bit.

18. The device for controlling a code rate according to claim 17, wherein the quantization parameter acquiring unit comprises:

an initial target quantization step length acquiring module, configured to acquire an initial target quantization step length $Qstep_o^j = Qstep_i^j (N_i^j/N_{oT}^j)^{1/2}$ according to the nonlinear code rate control model;

an optimization acquiring module, configured to optimize the initial target quantization step length so as to acquire an optimized target quantization step length $Qstep_{o1}^j = Qstep_o^j \cdot \alpha^j \cdot \beta^j$, wherein $\alpha^j = \overline{Qstep_{oT}^{j-1} \cdot (N_{oA}^{j-1})^{1/2}}/\overline{Qstep_i^{j-1} \cdot (N_i^{j-1})^{1/2}}$, and $\beta^j = (\overline{N_{oA}^{j-1}}/\overline{N_i^{j-1}})/(N_{oT}^j/N_i^j)$; and an acquiring module, configured to look up a quantization parameter table according to the initial target quantization step length or the optimized target quantization step length, so as to acquire the target quantization parameter.

19. A transcoder, comprising:

a decoding device, configured to acquire input transcoding information of an input video code stream;

a code rate control device, configured to acquire an output target bit according to output transcoding information and the input transcoding information acquired by the decoding device, and acquire an output target quantization parameter according to a nonlinear code rate control model by utilizing the output target bit, wherein the nonlinear code rate control model is a model with a constant product of a code rate and square of a quantization step length: $(Qstep_o^j)^2 \cdot N_{oT}^j = (Qstep_i^j)^2 \cdot N_i^j$, wherein $Qstep_o^j$ is an initial target quantization step length of the current frame, $N_{oT}^j$ is the output target bit of the current frame, $Qstep_i^j$ is an input quantization step length of the current frame, and $N_i^j$ is an input bit of the current frame; and an encoding device, configured to perform encoding according to the target quantization parameter acquired by the code rate control device to generate an output code stream.

20. The transcoder according to claim 19, wherein the nonlinear code rate control model is a model with a constant product of a code rate and square of a quantization step length: $(Qstep_o^j)^2 \cdot N_{oT}^j = (Qstep_i^j)^2 \cdot N_i^j$, wherein $Qstep_o^j$ is an initial target quantization step length of a current processing frame, $N_{oT}^j$ is an output target bit of the current processing frame, $Qstep_i^j$ is an input quantization step length of the current processing frame, and $N_i^j$ is an input bit of the current processing frame.

* * * * *